(12) United States Patent
Stappaerts (10) Patent No.: US 6,791,735 B2
(45) Date of Patent: Sep. 14, 2004

(54) DIFFERENTIALLY-DRIVEN MEMS SPATIAL LIGHT MODULATOR

(75) Inventor: Eddy A. Stappaerts, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/340,317

(22) Filed: Jan. 9, 2003

(65) Prior Publication Data

US 2004/0008396 A1 Jan. 15, 2004

Related U.S. Application Data

(60) Provisional application No. 60/347,300, filed on Jan. 9, 2002.

(51) Int. Cl.[7] .............................. G02F 1/03; G02F 1/07; G02B 26/00
(52) U.S. Cl. ..................... 359/245; 359/290; 359/291
(58) Field of Search .................. 359/245, 290–291, 359/223–224, 298; 310/328; 348/770; 385/31, 37, 16, 18, 25, 26, 40–42, 48, 146, 901

(56) References Cited

U.S. PATENT DOCUMENTS 5,771,321 A * 6/1998 Stern ........................... 385/31
6,329,738 B1 * 12/2001 Hung et al. ................. 310/309
6,433,917 B1 * 8/2002 Mei et al. .................... 359/292
6,438,282 B1 * 8/2002 Takeda et al. ................ 385/16

* cited by examiner

Primary Examiner—Hung Xuan Dang
Assistant Examiner—Joseph Martinez
(74) Attorney, Agent, or Firm—James S. Tak; Alan H. Thompson; Michael C. Staggs (57) ABSTRACT

A MEMS SLM and an electrostatic actuator associated with a pixel in an SLM. The actuator has three electrodes: a lower electrode; an upper electrode fixed with respect to the lower electrode; and a center electrode suspended and actuable between the upper and lower electrodes. The center electrode is capable of resiliently-biasing to restore the center electrode to a non-actuated first equilibrium position, and a mirror is operably connected to the center electrode. A first voltage source provides a first bias voltage across the lower and center electrodes and a second voltage source provides a second bias voltage across the upper and center electrodes, with the first and second bias voltages determining the non-actuated first equilibrium position of the center electrode. A third voltage source provides a variable driver voltage across one of the lower/center and upper/center electrode pairs in series with the corresponding first or second bias voltage, to actuate the center electrode to a dynamic second equilibrium position.

27 Claims, 7 Drawing Sheets

DIFFERENTIALLY-DRIVEN MEMS SPATIAL LIGHT MODULATOR

I. CLAIM OF PRIORITY IN PROVISIONAL APPLICATION

This application claims priority in provisional application filed on Jan. 9, 2002, entitled "Differentially-driven MEMS SLM" serial No. 60/347,300, by Eddy A. Stappaerts.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to spatial light modulators. The invention relates more particularly to low voltage MEMS-based (micromachined electromechanical system) electrostatic actuators and MEMS-based phase spatial light modulators utilizing the same.

III. BACKGROUND OF THE INVENTION

The use of high performance spatial light modulators (SLMs) for military and commercial adaptive optics (AO) applications is increasing rapidly. Examples are free-space communication systems corrected for atmospheric distortion, compensated imaging systems, secure holographic storage systems, optical computers, and various defense applications, among others. Key SLM characteristics are high speed, high phase resolution, large number of pixels, small size/weight, and low cost. SLMs based on micromachined electromechanical systems (MEMS) technology have received much attention for their potential to achieve the desired performance parameters while greatly minimizing size. For example, size minimization is typically achieved by integrating the electronic driver for each pixel with the MEMS structure.

Figure 1:
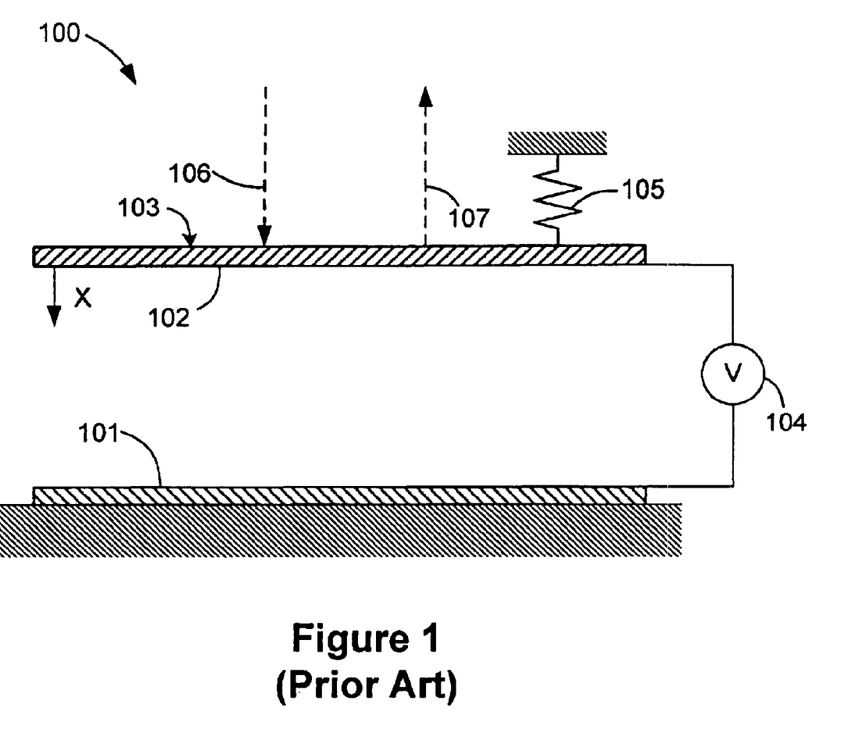
FIG. 1 is a schematic elevational view of a conventional parallel plate electrostatic actuator known in the prior art.

MEMS AO designs have typically been based on conventional parallel plate electrostatic actuators as shown in FIG. 1, and generally indicated at reference character 100. The actuator 100 is shown having two parallel plates 101 and 102 which are spaced apart with an electric voltage 104 applied therebetween. While not shown, the lower plate 101 is typically fixed, while the upper plate 102 is movable in a direction normal to the surface of the plate. Additionally, the conventional parallel plate electrostatic actuator is modeled to account for mechanical energy storage, such as potential energy storage in a flexible plate or a spring connected to a rigid plate (see 105), or the kinetic energy generated by plate movement. As shown in FIG. 1, the movable plate 102 is typically a mirror having a reflective surface 103 to reflect incident light 106, as indicated by arrow 107. As an alternative (not shown) a mirror is often connected to the movable plate by means of a connecting anchor, in order to prevent mirror warpage due to plate movement.

In the conventional parallel plate electrostatic actuator of FIG. 1, applying a voltage 104 operates to attract the two plates together and thereby move the upper plate downward. However, the drive voltage necessary to actuate these parallel plate electrostatic actuators are very high, typically on the order of 50–200 V or higher depending on the required plate motion and the response time. Even though MEMS SLMs do not draw significant current, the high voltage requirement has various drawbacks. For example, the high voltage requirement necessitates the use of large high voltage transistors where only limited space is available. For the scaleable architectures required in many applications involving thousands to millions of individually controlled pixels, electronics must be integrated with the MEMS mirrors. Because pixel sizes are on the order of about 100 microns on a side, there is limited space below the mirrors to incorporate drive electronics. High voltage transistors are much larger than low voltage transistors used in common integrated circuits, making it challenging to integrate the required circuitry. Moreover, the large space requirements of high voltage transistors leave little or no room for other control electronics, such as feedback control circuits. And high voltage power supplies typically dominate the overall system size. The power dissipation from high voltage drivers is also a concern, as temperature gradients may cause mirror warpage. And with high voltage drivers, active cooling may be required which further increases system complexity, size, and cost.

Figure 2:
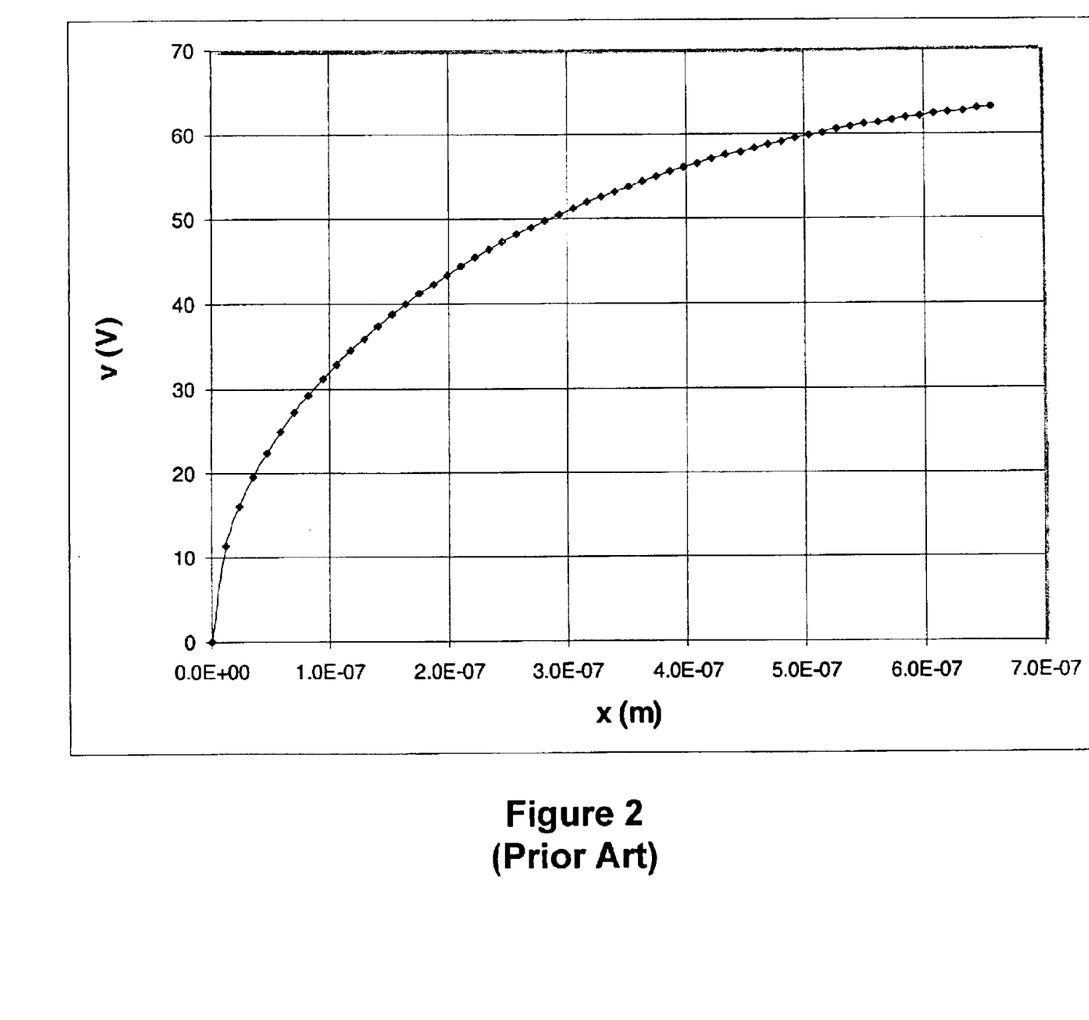
FIG. 2 is a graph illustrating the nonlinearity of displacement response produced when a drive voltage is applied to a conventional parallel plate electrostatic actuator known in the prior art.

Another significant drawback of conventional parallel plate electrostatic actuators is their highly non-linear response, which must be compensated for through additional electronics. FIG. 2 shows a graph illustrating the strongly non-linear displacement-versus-voltage characteristics typically seen in present SLM devices, (e.g. utilizing a conventional parallel plate electrostatic actuator). Such SLM devices therefore require high precision electronics drivers for adaptive control and error correction, further increasing complexity, size, and cost.

In summary, therefore, there is a need for a MEMS-based SLM, as well as a MEMS-based electrostatic actuator, designed to require lower drive voltages to reduce system cost and size, while further enhancing performance parameters such as response linearity.

IV. SUMMARY OF THE INVENTION

One aspect of the present invention includes an electrostatic actuator associated with a pixel in a spatial light modulator having a plurality of pixels. The actuator comprises: a lower electrode; an upper electrode fixed with respect to the lower electrode; a center electrode suspended and actuable between the upper and lower electrodes, and having resiliently-biasing means for restoring the center electrode to a non-actuated first equilibrium position; a mirror operably connected to the center electrode; a first voltage source for providing a first bias voltage across the lower and center electrodes; a second voltage source for providing a second bias voltage across the upper and center electrodes, wherein the first and second bias voltages determine the non-actuated first equilibrium position of the center electrode; and a third voltage source for providing a variable driver voltage across one of the lower/center and upper/center electrode pairs in series with the corresponding first or second bias voltage, for actuating the center electrode to a dynamic second equilibrium position.

Another aspect of the present invention includes a spatial light modulator (SLM) comprising: an array of electrostatic actuators, each representing a pixel of the SLM and comprising: a lower electrode; an upper electrode fixed with respect to the lower electrode; a center electrode suspended and actuable between the upper and lower electrodes, and having resiliently-biasing means for restoring the center electrode to a non-actuated first equilibrium position; a mirror operably connected to the center electrode; a first voltage source for providing a first bias voltage across the lower and center electrodes; a second voltage source for providing a second bias voltage across the upper and center electrodes, wherein the first and second bias voltages determine the non-actuated first equilibrium position of the center electrode; and a third voltage source for providing a variable driver voltage across one of the lower/center and upper/center electrode pairs in series with the corresponding first or second bias voltage, for actuating the center electrode to a dynamic second equilibrium position.

Another aspect of the present invention includes a MEMS electrostatic actuator comprising: a first electrode layer; a second electrode layer fixed with respect to the first electrode layer; a center electrode layer suspended and actuable between the first and second electrode layers and having resiliently-biasing means for restoring the center electrode layer to a non-actuated first equilibrium position; a first voltage source for providing a first bias voltage across the first and center electrode layers; a second voltage source for providing a second bias voltage across the second and center electrode layers, wherein the first and second bias voltages determine the non-actuated first equilibrium position of the center electrode layer; and a third voltage source for providing a variable driver voltage across one of the first/center and second/center electrode layer pairs in series with the corresponding first or second bias voltage, for actuating the center electrode layer to a dynamic second equilibrium position.

Another aspect of the present invention includes a process for controlling a spatial light modulator (SLM) comprising the steps of: providing a SLM having a plurality of electrostatic actuators, each actuator having a lower electrode, an upper electrode fixed with respect to the lower electrode, a center electrode suspended and actuable between the upper and lower electrodes with resiliently-biasing means for restoring the center electrode to a non-actuated first equilibrium position, and a mirror operably connected to the center electrode; for each electrostatic actuator, (a) providing a first bias voltage across the lower and center electrodes, and a second bias voltage across the upper and center electrodes, to establish the corresponding non-actuated first equilibrium position; and (b) applying a variable driver voltage across one of the lower/center and upper/center electrode pairs in series with the corresponding first or second bias voltage to actuate the center electrode to a dynamic second equilibrium position, wherein the variable driver voltage is applied independent of other actuators.

Another aspect of the present invention includes an electrostatic actuation process comprising: providing first and second electrodes fixed relative to each other and a center electrode suspended and actuable between the first and second electrodes, the center electrode having resiliently-biasing means for restoring the center electrode to a non-actuated first equilibrium position; providing a first bias voltage across the first and center electrodes, and a second bias voltage across the second and center electrodes to establish the non-actuated first equilibrium position; and actuating the center electrode to a second dynamic equilibrium position by applying a variable driver voltage across one of the first/center and second/center electrode pairs in series with the corresponding first or second bias voltage.

V. BRIEF DESCRIPTION OF THE DRAWINGS

The accompanying drawings, which are incorporated into and form a part of the disclosure, are as follows.

VI. DETAILED DESCRIPTION

A MEMS-based electrostatic actuator and actuation method, such as those designed for use in SLMs, is disclosed having three electrodes: a lower electrode, an upper electrode fixed with respect to the lower electrode, and a center electrode suspended between the lower and upper electrodes. A bias voltage is applied between the lower and center electrodes (lower/center pair), and also between the upper and center electrodes (upper/center pair), though not necessarily of the same magnitude. The center electrode is actuable between the lower and upper electrodes when a variable voltage is applied between one of the two electrode pairs. While not intended to be limiting, the driver voltage is preferably applied between the lower/center pair, primarily in order to allow positioning of driver electronics below and adjacent the lower electrode, as will be discussed herein. It is also notable that the fixed relationship between the upper and lower electrodes indicates that, at least during and for purposes of modulation, the distance between the upper electrode and lower electrode does not change.

Also disclosed is an SLM and an SLM control method, where the SLM has a plurality of pixels represented by an array of MEMS-based electrostatic actuators each having the three-electrode structure per pixel discussed above. The center electrodes of the pixels together form a pixelated actuator array (an electrode layer), which is held at a common electrical potential, e.g. ground. One of the upper electrode grouping (electrode layer) or lower electrode grouping (electrode layer) is preferably non-pixelated, i.e. having a single, undifferentiated-per-pixel, electrode construction across the SLM, and is held at a fixed bias voltage with respect to the center electrode(s). In contrast, the other one of the upper electrode grouping or lower electrode grouping of the SLM is pixelated, with each pixelated electrode preferably having a bias voltage with respect to the center electrode. While not intended to be limiting, the lower electrode grouping is preferably selected as the pixelated electrode grouping for the same reason discussed above, i.e. to allow positioning of independent driver electronics below and adjacent each pixelated lower electrode. In this manner, each of the pixelated and actuable center electrodes may be actuated independent of other center electrodes. It is notable that the center electrodes are considered pixelated, not because of differentiated electric potentials therebetween, but because of their ability to be independently actuated relative to each other.

The three-electrode arrangements of the present invention effectively reduce the variable driver or dynamic voltage required for actuation of the center movable electrode, and thereby also reduces the complexity, size and cost of the SLM electronics. It also effectively lowers power dissipation by reducing voltage, and simplifies the electronics by reducing the required voltage resolution (number of bits) due to a closer-to-linear phase vs. voltage characteristic compared to the prior art. It is notable that while voltage control is discussed herein, it is appreciated that charge control may be utilized in the alternative, though voltage control is generally easier to implement for small capacitances and is therefore the more common design in practical applications.

Figure 3:
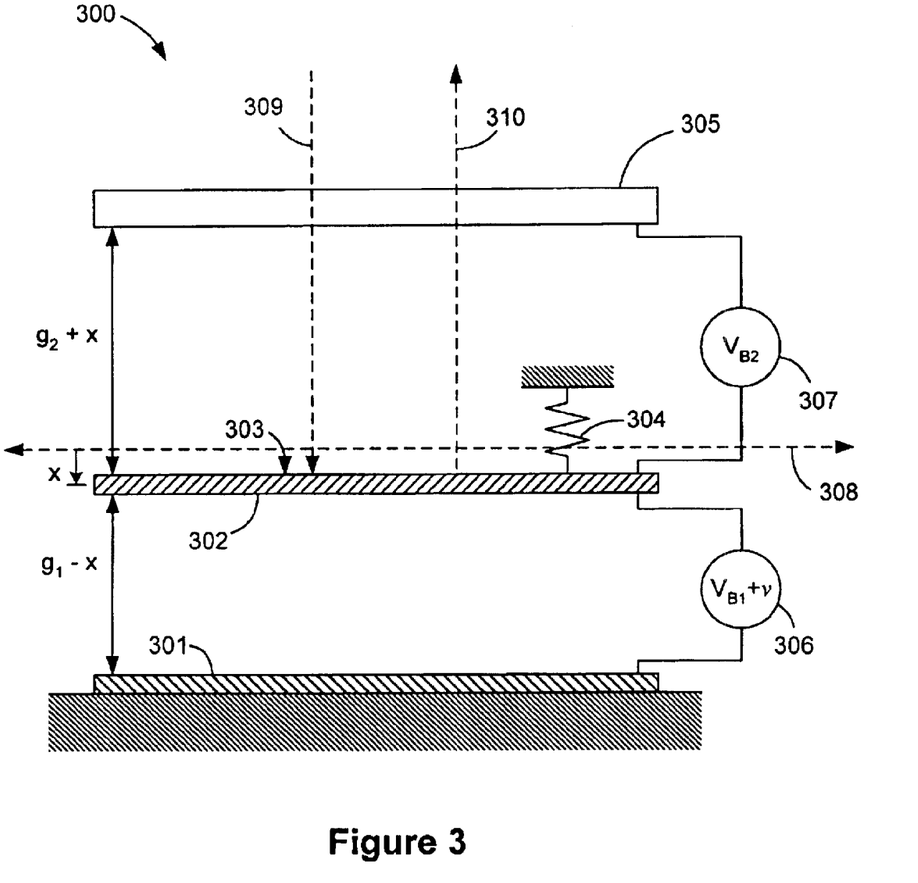
FIG. 3 is a schematic elevational view of a first exemplary embodiment of a MEMS electrostatic actuator of the present invention.

Turning now to the drawings, FIG. 3 shows a schematic elevational view of a first exemplary embodiment of a MEMS electrostatic actuator of the present invention, generally indicated at reference character 300. It is appreciated that the electrostatic actuator may be representative of a single pixel in a multi-pixel electrostatic actuator array of an SLM. In any case, the electrostatic actuator 300 has three electrodes (per pixel if as a part of a multi-electrode array of an SLM): a lower electrode 301, a movable/actuable center electrode 302, and an upper electrode 305 fixed with respect to the lower electrode. The three electrodes are shown each having a generally planar configuration and arranged generally parallel to each other. And the movable center electrode 302 is shown as a mirror having a reflective surface 303 on one side of the center electrode 302 for reflecting incident light as shown at 309 and 310. It is appreciated, however, that the mirror and the center electrode may be structurally autonomous but still operably connected to each other, whereby movement of the center electrode likewise actuates the mirror. Additionally, the upper electrode is a transparent medium to the incident (laser) light 309. Transparency may differ for different materials, with material selection dependent on the type and nature of the application. For example, Si is transparent in IR, and fused silica plus ITO coating in visible light.

Actuation, and thus operation, of the three-electrode actuator occurs by controlling the voltages across the upper/center electrode pair and/or the lower/center electrode pair, to produce a net actuating force on the movable center electrode 302. As shown in FIG. 3, a bias voltage source 307 is initially provided to produce a bias voltage $V_{B2}$ across the upper/center electrode pair. And a second bias voltage source 306 is also provided to initially produce a bias voltage $V_{B1}$ across the lower/center electrode pair. As mentioned above, the center electrode 302 is the electrical ground. Typical bias voltage ranges may be from about 10V to about 100V. Actual voltage selection may depend on the wavelength of the incident light to be modulated, since the required maximum deflection typically increases proportionally with wavelength. Moreover, the bias voltages $V_{B1}$ and $V_{B2}$ may be selected depending on other design parameters, such as the spring constant k, discussed in detail below together with the controlling equilibrium equation (Eqn. 1). In the absence of a driver voltage, the bias voltages $V_{B1}$ and $V_{B2}$ operate to establish the equilibrium position 308 of the center electrode.

Subsequently, a driver voltage v (at 306) is applied across the lower/center electrode pair which, depending on its polarity, increases or decreases the attractive force present between the lower and center electrodes. The additional driver voltage may be supplied by driver electronics (not shown), which may be an integral component of the bias voltage source producing the bias voltage $V_{B1}$, as shown at 306. Or in the alternative, independent driver electronics/voltage source (not shown) may be provided to supply the driver voltage v in series with the bias voltage $V_{B1}$. In any case, the additional driver voltage is typically less than the bias voltage $V_{B1}$, although typically not significantly less than (<<) the bias voltage $V_{B1}$. A representative driver voltage range would be a factor of about 2 to about 5 lower than the bias voltages. The comparatively lower driver voltage required for actuation may thus enable substantially smaller driver electronics/voltage sources to be utilized and integrated, in place of the large high voltage transistors (on the order of 100V) conventionally used to effect actuation. Consequently, the smaller driver electronics and circuitry may in turn be positioned at each pixel location, e.g. below the respective pixelized lower electrode. Additionally, the increased space below each pixel can allow other circuitry, such as feedback control circuitry, to also be integrated.

Upon actuation, the center electrode 302 is displaced between the upper and lower electrodes in a transverse direction to an equilibrium plane indicated at 308. As shown in FIG. 3, the center electrode is shown displaced a distance x below the equilibrium plane 308. The driver voltage, which is variable, actuates the center electrode 302 a distance which is substantially proportional to the applied driver voltage. It is appreciated that prior to the application of the driver voltage, the two bias voltages $V_{B1}$ and $V_{B2}$ between the upper/center electrode pair and the lower/center electrode pair operate to maintain the center electrode 302 at an initial equilibrium position, indicated at 308. The non-actuated equilibrium equation for the center electrode (and mirror) in the absence of a driver voltage is as follows:

$$kx=0.5\epsilon_0 S[(V_{B1})^2/(g_1)^2-(V_{B2})^2/(g_2)^2] \quad \text{(Eqn. 1)}$$

where k is the spring constant, $\epsilon_0$ is the electric permittivity of free space, S is the surface area of one electrode plate, $g_1$ is the gap space between the lower/center electrode pair and $g_2$ is the gap space between the upper/center electrode pair. The spring constant k is chosen by design to achieve a desired reaction time, and the gap sizes as well as the bias voltages, may be respectively different.

When an additional driver voltage v is applied, the following modified dynamic equilibrium equation for the center electrode controls:

$$kx=0.5\epsilon_0 S[(V_{B1}+v)^2/(g_1-x)^2-(V_{B2})^2/(g_2+x)^2] \quad \text{(Eqn. 2)}$$

Actuation of the center electrode 302 is shown in a downward direction, with the upper gap, $g_2$, increasing to $g_2+x$ and the lower gap, $g_1$, decreasing to $g_1-x$. As shown in FIG. 3, the restoring force due to the spring constant k is schematically represented by spring 304. It is appreciated, however, that the mirror/actuator displacement can be both positive and negative, due to the application of electrostatic force in both directions. This allows a reduction in the gap size and also a further reduction in driver voltage and/or increase in speed.

It is notable that, for simplification, the electrical field produced by the applied voltages is assumed to be uniform between the electrode plates, and zero outside, thereby assuming a non-zero curl at the edges of the plates, despite Maxwell's equations to the contrary. Additionally, displacement/actuation may be limited by suitable means, such as a mechanical stop, in order to avoid the spontaneous "snap-down" or "pull in" phenomena known in the art, which occurs as the voltage is increased beyond it's maximum stable value. Snap-down causes the moving electrode to hit the lower plate. Therefore, stable operation of the voltage-controlled electrostatic actuator is generally accepted to occur over one-third of the full range of motion.

Figure 4:
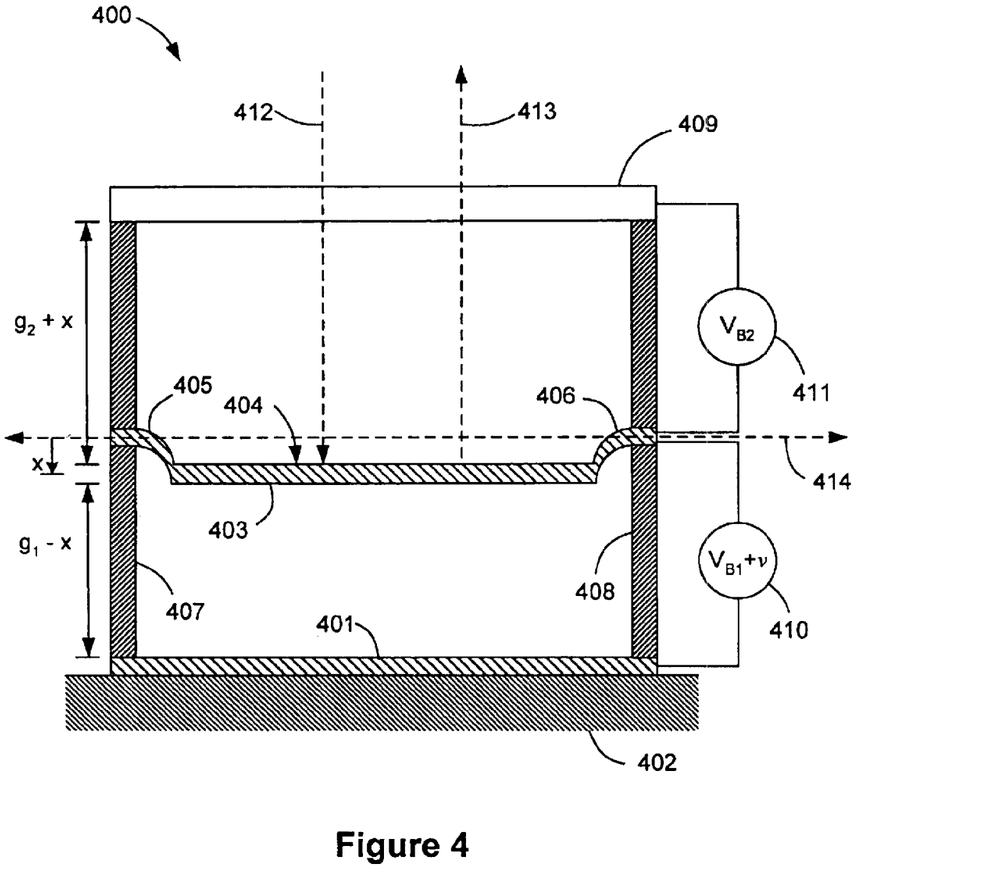
FIG. 4 is a schematic elevational view of a second exemplary embodiment of a MEMS electrostatic actuator of the present invention.
Figure 6:
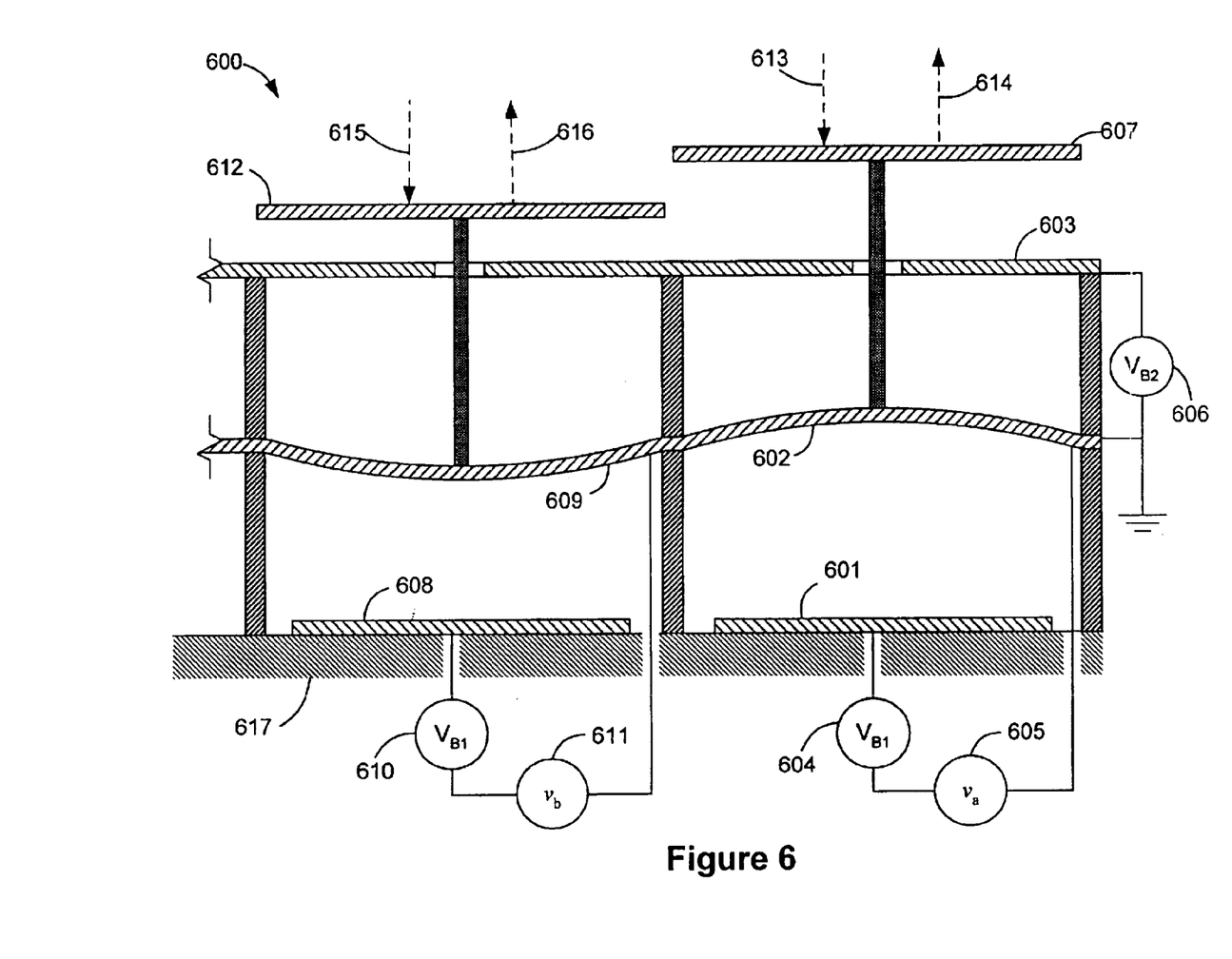
FIG. 6 is a schematic elevational and partial view of an exemplary phase SLM having a pixelized array of MEMS electrostatic actuators (two actuators shown).

FIG. 4 shows a second exemplary embodiment of a MEMS electrostatic actuator of the present invention, generally indicated at reference character 400, which may form one pixel of an SLM. Similar to the first exemplary embodiment the actuator 400 includes a lower electrode 401, a movable center electrode 403, and an upper electrode 409. The lower electrode 401 is shown formed on a substrate 402, which enables integration of circuitry as known in the relevant arts. Additionally, a first bias voltage source 411 provides a bias voltage $V_{B2}$ across the upper/center electrode pair, and a second bias voltage source 410 provides, for example, both the bias voltage $V_{B1}$ and the driver voltage v across the lower/center electrode pair. Additionally, offset structures 407 and 408 are provided extending from about the upper electrode 409 to about the lower electrode 401. It is notable that although the offsets are shown contacting the lower electrode 401, this need not be the case as shown in FIG. 6. As shown in FIG. 4, the center electrode is suspended at its ends between the upper 409 and lower 401 electrodes by means of the offset structures 407, 408. In particular, the offset structures 407, 408 operate to suspend the center electrode 403 at an offset location away from the upper and lower electrodes, thereby providing actuation space for the center electrode. The offset structures 407, 408 also function to electrically insulate the center electrode 403 from the upper and lower electrodes.

Additionally, FIG. 4 shows the center electrode having a rigid portion 404 which remains unbiased during actuation. The rigid portion 404 is connected to the offsets 407, 408 by resiliently-biasing connectors 405 and 406, embodying the spring constant k. The advantage of this embodiment is appreciated when the rigid portion 404 functions as the mirror, having a reflective surface 404 for reflecting incident light as shown by 412 and 413. In particular, phase modulation of incident light may thereby be more precisely controlled by maintaining the flatness of the mirror.

Figure 5:
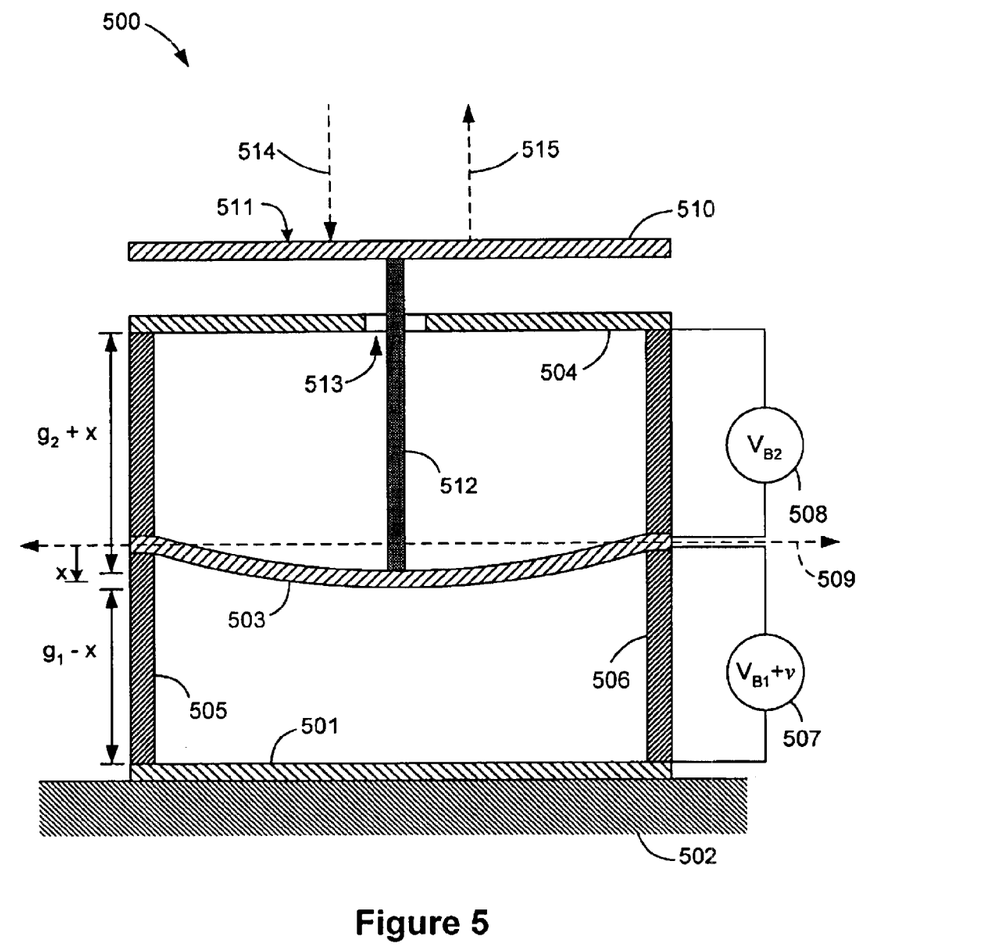
FIG. 5 is a schematic elevational view of a third exemplary embodiment of a single pixel electrostatic actuator of the present invention.

Another exemplary alternative embodiment of a MEMS electrostatic having a "mushroom design" is shown in FIG. 5 which also benefits from maintaining the flatness of the mirror during actuation. Similar to FIG. 4, the actuator 500 includes a lower electrode 40 shown formed on a substrate 502, a center electrode 503 suspension-mounted on offsets 505 and 506, and an upper electrode 504 fixed with respect to the lower electrode 501 via the offsets. And, a voltage source 508 provides a bias voltage across the upper/center electrode pair, and another voltage source 507 provides a bias voltage and a driver voltage across the lower/center electrode pair.

Additionally, a mirror 510 having a reflective surface 511 is shown connected to the center electrode 503 by means of a connector arm 512 extending through an aperture 513 in the upper electrode 504. In this manner, actuation of the center electrode 503 also actuates the mirror 515, and the mirror's reflective surface 511 can reflect incident light 514, 515 without the light having to first pass through a transparent medium. The connector arm 512 is preferably constructed from a electrically insulating material. The center electrode 503 is constructed from a suitable mechanically flexible material, to resiliently bias in the transverse direction when a drive voltage v is applied. In this manner, while resilient biasing of the center electrode may cause some degree of warping, the mirror 510 remains flat during modulation.

In FIG. 6, a MEMS SLM, generally indicated at reference character 600, is shown incorporating the electrostatic actuator shown in FIG. 5. In particular two adjacent pixels are shown in order to illustrate independent actuation and operation of the actuators. For each of the two pixels shown, the SLM 600 includes a discrete lower electrode (601 and 608) formed on a substrate 617. Each pixel also includes a center electrode (602 and 609) which is shown electrically in common across the SLM, i.e. the electrical ground. The SLM 600 also includes an upper electrode 603 which is also electrically common across all pixels. Compared to the discrete structures of the lower electrodes, the upper electrode 603 and the center electrode (including 602 and 609) may be formed as a single layer or a monolithic structure spanning the entire SLM.

Examining the electrical configuration of the SLM 600, a bias voltage source 606 serves to produce a bias voltage $V_{B2}$ across the upper electrode layer 603 and the center electrode layer (including 602 and 609). However, the bias voltage $V_{B1}$ across each of the lower/center electrode pairs per pixel is independent of all other bias voltages across the lower/center electrode pairs. As shown, a bias voltage $V_{B1}$ is initially produced by a bias voltage source 604 across the lower/center electrode pair 601 and 602. And a bias voltage $V_{B1}$ is also initially produced by a different bias voltage source 610 across the lower/center electrode pair 608 and 609. Additionally, independent driver voltage sources are provided such as shown by 605 and 611. In particular, driver voltage source 605 applies an additional driver voltage $v_a$ in series with the bias voltage $V_{B1}$ of 604 and driver voltage source 611 applies an additional driver voltage $v_b$ in series with the bias voltage $V_{B1}$ of 610. Electrical connections to the electrodes may be made through vias in the substrate 617, as shown. In this manner, incident light at each pixel (613–616) may be independently modulated by only varying the driver voltage at each pixel, and not the bias voltages.

Figure 7:
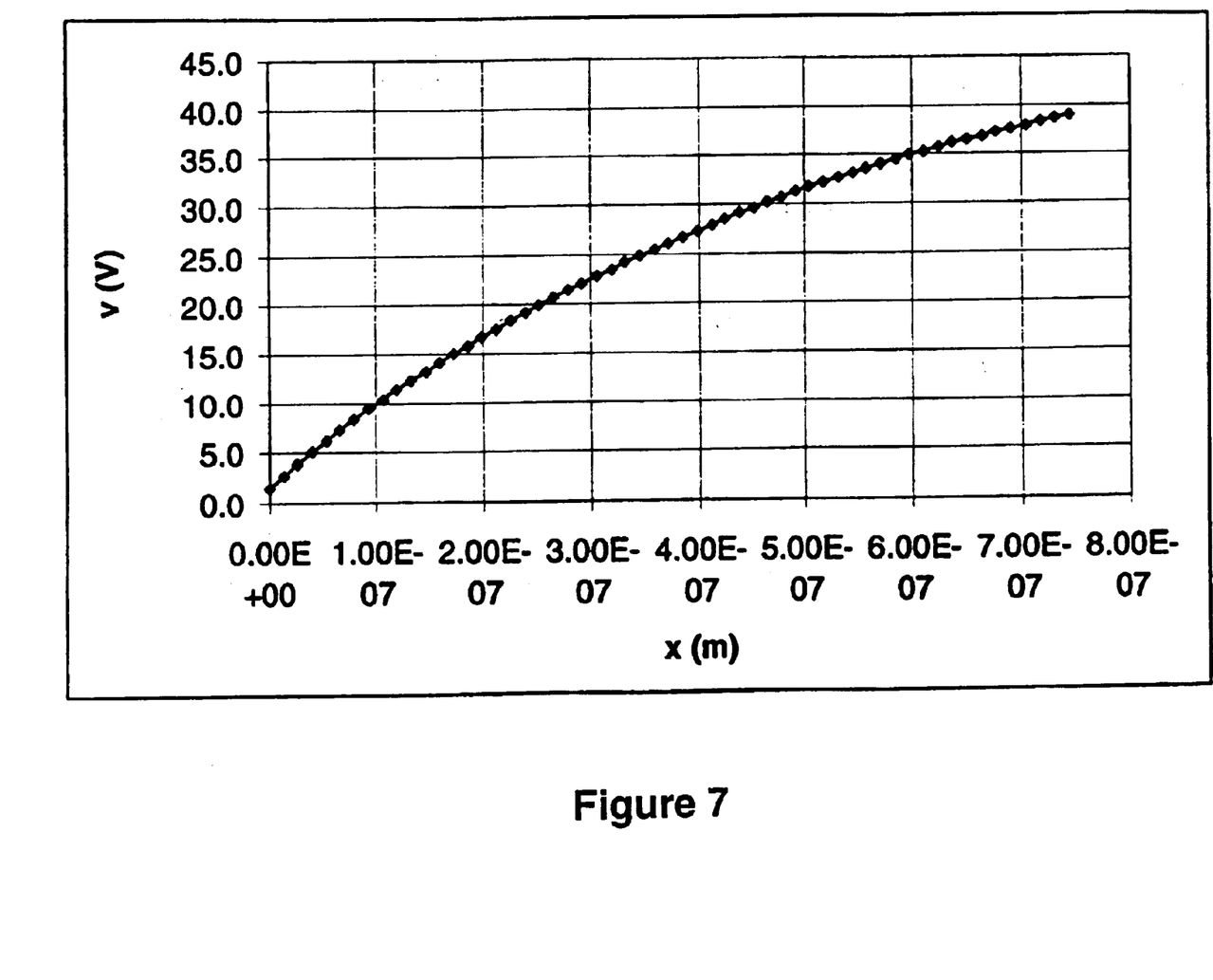
FIG. 7 is a graph illustrating the substantial linearity of displacement response produce when a drive voltage is applied to the three-electrode actuator of the present invention.

In FIG. 7, a graph is shown for the present invention, characterizing displacement in response to a dynamically controlled voltage. The results of FIG. 7 may be compared directly with that of FIG. 2 showing a similar graph for the two-electrode conventional design. The data presented in FIGS. 2 and 7 are the result of research conducted at the Lawrence Livermore National Laboratory. Both graphs in FIGS. 2 and 7 are based on the following selected SLM parameters shown in Table 1, and representative of MEMS-scale SLMs.

TABLE 1

| Parameter | Value |
| --- | --- |
| Pixel size ($\mu$m) | 300 |
| Effective pixel thickness ($\mu$m) | 5 |
| Gap-1 ($\mu$m) | 4.5 |
| Gap-2 ($\mu$m) | 4.5 |
| k (N/m) | 352 |
| V-bias (V) | 70 |
| $T_{res}$ ($\mu$m) | 10 |

As can be seen from a comparison of the two graphs of FIG. 2 and FIG. 7, the SLM of the present invention can cause the same displacement as a conventional parallel plate actuator with less than half the driving voltage. The slope dv/dx varies by a factor 30 for FIG. 2 of the conventional design, but only a factor of 4 in FIG. 7 of the present invention. Furthermore, the dynamic voltage range is 100V for FIG. 2, but less than 40V for FIG. 7. Thus, the application of a driver voltage on top of a steady bias voltage, as described for the present invention, would allow a decrease in the dynamically controlled voltage, thus simplifying the electronics.

Furthermore, the graph of FIG. 7 also illustrates the substantial linearity of displacement response produced when a drive voltage is applied to the three-electrode actuator of the present invention. In contrast, conventional two-electrode SLMs exhibit a highly non-linear response which must be compensated for through additional electronics. Such conventional SLM devices therefore typically require high precision electronics drivers for adaptive control and error correction, further increasing complexity, size, and cost. In contrast, reduction of the required variable voltage in the present invention also reduces the complexity, size and cost of the SLM electronics. In particular, it can lower power dissipation which may cause warpage, and also simplify the electronics by reducing the required voltage resolution (number of bits) due to a closer-to-linear phase vs. voltage characteristic.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. In a spatial light modulator having a plurality of pixels, an electrostatic actuator associated with a pixel and comprising:
    a lower electrode;
    an upper electrode fixed with respect to the lower electrode;
    a center electrode suspended and actuable between the upper and lower electrodes, and having resiliently-biasing means for restoring the center electrode to a non-actuated first equilibrium position;
    a mirror operably connected to the center electrode;
    a first voltage source for providing a first bias voltage across the lower and center electrodes;
    a second voltage source for providing a second bias voltage across the upper and center electrodes, wherein the first and second bias voltages determine the non-actuated first equilibrium position of the center electrode; and
    a third voltage source for providing a variable driver voltage across one of the lower/center and upper/center electrode pairs in series with the corresponding first or second bias voltage, for actuating the center electrode to a dynamic second equilibrium position characterized by a displacement response substantially linearly proportional to the variable driver voltage due to the pre-existing bias voltages provided by the first and second voltage sources, whereby the center electrode and the mirror are capable of high-precision positioning.

2. The electrostatic actuator as in claim 1,
wherein the upper electrode is transparent and the center electrode includes the mirror on a surface thereof facing the upper electrode.

3. The electrostatic actuator as in claim 1,
wherein the mirror is connected to the center electrode via a connector arm extending through an aperture in the upper electrode.

4. The electrostatic actuator as in claim 1,
further comprising an electrically insulating offset fixed with respect to the upper and lower electrodes, with the center electrode suspension-mounted at opposite ends thereof to the offset.

5. The electrostatic actuator as in claim 4,
wherein the center electrode is mechanically flexible to resiliently bias in a transverse direction.

6. The electrostatic actuator as in claim 4,
wherein the center electrode includes a mechanically rigid portion suspension-mounted at opposite ends thereof to the offset via resiliently-biasing connectors.

7. The electrostatic actuator as in claim 6,
wherein the mirror and the mechanically rigid portion of the center electrode together form a monolithic unit.

8. The electrostatic actuator as in claim 1,
wherein the driver voltage is less than each of the first and second bias voltages.

9. The electrostatic actuator as in claim 8,
wherein the driver voltage is a factor of about 2 to about 5 lower than the bias voltages.

10. The electrostatic actuator as in claim 1,
wherein the third voltage source is exclusive to the respective pixel.

11. The electrostatic actuator as in claim 10,
wherein the third voltage source is located at the respective pixel.

12. The electrostatic actuator as in claim 1,
wherein the variable driver voltage is in the range of about 10V to about 100V.

13. The electrostatic actuator as in claim 1,
wherein the variable driver voltage actuates the center electrode between the upper and lower electrodes substantially proportional to the variable driver voltage.

14. The electrostatic actuator as in claim 1,
wherein electronic circuitry for the third voltage source is located at each pixel below the actuator.

15. A spatial light modulator (SLM) comprising:
an array of electrostatic actuators, each representing a pixel of the SLM and comprising:
    a lower electrode;
    an upper electrode fixed with respect to the lower electrode;
    a center electrode suspended and actuable between the upper and lower electrodes, and having resiliently-biasing means for restoring the center electrode to a non-actuated first equilibrium position;
    a mirror operably connected to the center electrode;
    a first voltage source for providing a first bias voltage across the lower and center electrodes;
    a second voltage source for providing a second bias voltage across the upper and center electrodes, wherein the first and second bias voltages determine the non-actuated first equilibrium position of the center electrode; and
    a third voltage source for providing a variable driver voltage across one of the lower/center and upper/center electrode pairs in series with the corresponding first or second bias voltage, for actuating the center electrode to a dynamic second equilibrium position characterized by a displacement response substantially linearly proportional to the variable driver voltage due to the pre-existing bias voltages provided by the first and second voltage sources, whereby the center electrode and the mirror are capable of high-precision positioning.

16. The SLM as in claim 15,
wherein the upper electrode of each pixel is electrically in common with the upper electrodes of the other pixels, whereby the second voltage source provides the same second bias voltage across the upper and center electrodes of the pixels.

17. The SLM as in claim 15,
wherein the upper electrodes of the pixels form a single electrode sheet across the pixels.

18. The SLM as in claim 15,
wherein the center electrode of each pixel is the electrical ground in common with the center electrodes of the other pixels.

19. The SLM as in claim 18,
wherein the center electrodes of the pixels form a single electrode sheet across the pixels.

20. The SLM as in claim 15,
wherein each third voltage source is exclusive to the respective pixel.

21. The SLM as in claim 20,
wherein the third voltage source is located at the respective pixel.

22. The SLM as in claim 15,
wherein the driver voltage is less than each of the first and second bias voltages.

23. The SLM as in claim 22,
wherein the driver voltage is a factor of about 2 to about 5 lower than the bias voltages.

24. The SLM as in claim 15,
wherein the variable driver voltage actuates the center electrode between the upper and lower electrodes substantially proportional to the variable driver voltage.

25. A MEMS electrostatic actuator comprising:
a first electrode layer;
a second electrode layer fixed with respect to the first electrode layer;
a center electrode layer suspended and actuable between the first and second electrode layers and having resiliently-biasing means for restoring the center electrode layer to a non-actuated first equilibrium position;
a first voltage source for providing a first bias voltage across the first and center electrode layers;
a second voltage source for providing a second bias voltage across the second and center electrode layers, wherein the first and second bias voltages determine the non-actuated first equilibrium position of the center electrode layer; and
a third voltage source for providing a variable driver voltage across one of the first/center and second/center electrode layer pairs in series with the corresponding first or second bias voltage, for actuating the center electrode layer to a dynamic second equilibrium position characterized by a displacement response substantially linearly proportional to the variable driver voltage due to the pre-existing bias voltages provided by the first and second voltage sources, whereby the center electrode and the mirror are capable of high-precision positioning.

26. A process for controlling a spatial light modulator (SLM) comprising the steps of:
providing a SLM having a plurality of electrostatic actuators, each actuator having a lower electrode, an upper electrode fixed with respect to the lower electrode, a center electrode suspended and actuable between the upper and lower electrodes with resiliently-biasing means for restoring the center electrode to a non-actuated first equilibrium position, and a mirror operably connected to the center electrode;
for each electrostatic actuator,
(a) providing a first bias voltage across the lower and center electrodes, and a second bias voltage across the upper and center electrodes, to establish the corresponding non-actuated first equilibrium position; and
(b) applying a variable driver voltage across one of the lower/center and upper/center electrode pairs in series with the corresponding first or second bias voltage to actuate the center electrode to a dynamic second equilibrium position characterized by a displacement response substantially linearly proportional to the variable driver voltage due to the provision of said first and second bias voltages, and to provide high-precision positioning of the center electrode and the mirror, wherein the variable driver voltage is applied independent of other actuators.

27. An electrostatic actuation process comprising:
providing first and second electrodes fixed relative to each other and a center electrode suspended and actuable between the first and second electrodes, the center electrode having resiliently-biasing means for restoring the center electrode to a non-actuated first equilibrium position;
providing a first bias voltage across the first and center electrodes, and a second bias voltage across the second and center electrodes to establish the non-actuated first equilibrium position; and
applying a variable driver voltage across one of the first/center and second/center electrode pairs in series with the corresponding first or second bias voltage, to actuate the center electrode to a second dynamic equilibrium position characterized by a displacement response substantially linearly proportional to the variable driver voltage due to the provision of said first and second bias voltages, and to provide high-precision positioning of the center electrode and the mirror.

* * * * *